United States Patent Office 2,820,042
Patented Jan. 14, 1958

2,820,042

2 - (DIALKYLAMINOALKYLTHIO)BENZOXAZOLES AND PROCESSES FOR THEIR PRODUCTION

Leon Katz, Springfield, and Murray S. Cohen, Dover, N. J., assignors to Schenley Industries, Inc., New York, N. Y., a corporation of Delaware No Drawing. Application March 7, 1955
Serial No. 492,794

7 Claims. (Cl. 260—307)

The present invention relates to a new class of compounds possessing activity as parasympatholytic agents and to processes for their production.

The compounds of the present invention are 2-(dialkylaminoalkylthio)benzoxazoles represented by the following general formula:

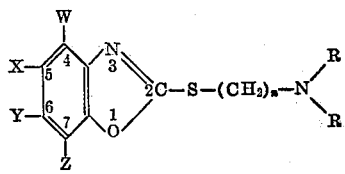

in which $n$ is a small integer; W, X, Y, and Z are hydrogen, lower alkyl, nitro, amino, alkanoylamido or halogen radicals; and

is a dialkylamino, morpholino or similar radical.

The salts of the foregoing bases, such as those with hydrogen halides, as well as the quaternary ammonium salts with alkyl halides, are preferred embodiments of the compounds of the present invention. Although these salts are referred to herein by such terms of hydrochlorides, hydrobromides, methobromides, and the like, they may also and perhaps more properly be desigated as ammonium derivatives.

In animal tests, at a dosage level of 0.25 milligram per kilogram, compounds of this class were generally as active antispasmodics as methantheline N. N. R. (β-diethylaminoethyl xanthene-9-carboxylate methobromide), while some demonstrated even greater activity.

The compounds of the present invention can be prepared by direct alkylation of 2-mercaptobenzoxazoles such as are described in our article published in J. Org. Chem., May 1954, vol. 19, No. 5, pages 758 to 766. In this reaction, although 2-mercaptobenzoxazole can exist in two tautomeric forms, one of which favors the production of N-alkylated compounds, alkylations with dialkylaminoalkyl halides, in accordance with the process of this invention, produce S-alkylated derivatives in preponderant yields.

The alkylating agents which may be used to prepare the compounds of the present invention include β-dimethylaminoethyl chloride, β-diethylaminoethyl chloride, 2-N-morpholinoethyl chloride, 3-N-morpholino-n-propyl chloride, and, in general, all similar dialkylaminoalkyl halides, as well as their equivalents, for example, salts with hydrogen halides, such as their hydrochlorides, which, in the presence of alkalies, liberate the free dialkylaminoalkyl halide.

Although the alkylation reactions can be effected in a single inert solvent, or even without a solvent, by direct action of the dialkylaminoalkyl halide upon the 2-mercaptobenzoxazole, we found it preferable to carry out the reaction in a two-phase solvent system consisting of an aqueous phase and an immiscible organic solvent phase, such as that consisting of water and toluene, that is disclosed in the examples hereinafter. Such a two-phase solvent reaction system is particularly satisfactory when an alkali such as potassium carbonate is present and the dialkylaminoalkyl halide is used in the form of a hydrohalide salt.

2-mercaptobenzoxazoles which are required for the preparation of the compounds of the present invention may be obtained as described in our article in J. Org. Chem., May 1954, vol. 19, No. 5, pages 758 to 766, by the reaction of a suitable ortho-aminophenol with potassium methyl xanthate or other alkali-metal alkyl xanthate. 2-mercaptobenzoxazoles thus prepared and their melting points are as follows:

| | M. P., °C. |
|---|---|
| 2-mercaptobenzoxazole | 189–191 |
| Substituted 2-mercaptobenzoxazoles: | |
| 4-hydroxy- | 232–234 |
| 6-hydroxy- | 293–294 |
| 5-chloro- | 260–261 |
| 6-chloro- | 224–225 |
| 7-chloro- | 264–265 |
| 5,7-dichloro- | 212–213 |
| 5,7-dimethyl- | 202–203 |
| 4,5,7-trichloro- | 284–286 |
| 5-tert-butyl- | 125–126 |
| 5-tert-butyl-7-chloro- | 194–195 |
| 5-chloro-7-isopropyl- | 197–200 |
| 5-(1,1,3,3-tetramethylbutyl)- | Oil |
| 5-nitro- | 244–245 |
| 6-nitro- | 234–235 |
| 5-amino- | 267–268 |
| 6-amino- | 225–226 |
| 5-acetamido- | 300–301 |
| 6-acetamido- | 295–296 |

From the alkylation reaction mixture, the 2-(dialkylaminoalkylthio)benzoxazoles may be recovered as free bases, or preferably, they are recovered and used in the form of salts with hydrogen halides or quaternary salts with alkyl halides, such as the hydrochloride, the hydrobromide, the methochloride, the methobromide and the methiodide.

The examples which follow illustrate typical compounds of the present invention and preferred methods for their preparation.

*Example 1.*—2-(2-diethylaminoethylthio)-5-tert-butyl-7-chlorobenzoxazole hydrochloride having the formula:

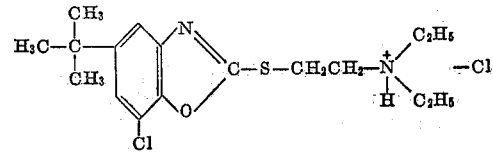

Into a flask fitted with a mechanical stirrer and a reflux condenser were added 9.7 grams (0.04 mole) of 5-tert-butyl-7-chloro-2-mercaptobenzoxazole (M. P. 194–195° C.), 7.7 grams (0.056 mole) of potassium carbonate, 6.5 grams (0.048 mole) of 2-diethylaminoethyl chloride hydrochloride, 40 milliliters of water and 60 milliliters of toluene. The two-phase system was heated under reflux with stirring for approximately 16 hours. At the end of this period, the mixture was cooled and the toluene phase was separated. The aqueous layer was extracted with two 20-milliliter portions of ether and the two ethereal extracts were combined with the toluene phase. After washing with water and drying over anhydrous magnesium sulfate, the product was precipitated from the combined extracts and toluene phase by the addition of ethereal hydrogen chloride. There was thus obtained a white crystalline powder having a melting point of 241–242° C. in a yield of approximately 95% of the stoichiometric. On recrystallizing the product from hot water, no substantial change in melting point took place.

The hydrochloride of 2-(2-diethylaminoethylthio)-5-tert-butyl-7-chlorobenzoxazole thus obtained may be converted to the free base, which is required for the following example, by dispersing it in ethyl acetate or other suitable solvent and neutralizing the solution with potassium or sodium bicarbonate or other suitable alkali (preferably in aqueous solution), removing the precipitated alkali-metal chloride by filtration, and evaporating the filtrate to recover the base. The free base may also be obtained in the original preparation hereinabove by evaporation of the combined toluene phase and ether extracts, prior to the addition of the ethereal hydrogen chloride. Such a direct preparation of a free base is also illustrated in Example 7 hereinafter.

*Example 2.*—2-(2-diethylaminoethylthio)-5-tert-butyl-7-chlorobenzoxazole methobromide having the formula:

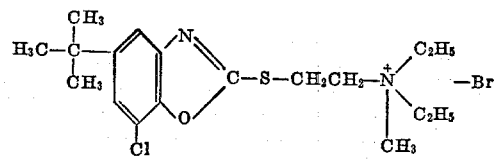

Into a solution in ethyl acetate of the free basic 2-2-(diethylaminoethylthio) - 5 - tert - butyl - 7 - chlorobenzoxazole (prepared as described in Example 1) a stream of gaseous methyl bromide was passed, while the temperature of the reaction mixture was observed. A white crystalline product precipitated from the solution with the evolution of heat. When the temperature began to fall, the passage of the methyl bromide was discontinued. The reaction mixture was allowed to stand overnight and the crystalline product was then separated by filtration and washed with ethyl acetate. The white crystalline methobromide had a melting point of 202–203° C. after recrystallization from a mixture of isopropanol and isopropyl ether, and it was obtained in a yield of 78% of the stoichiometric.

*Example 3.*—2-(2-diethylaminoethylthio)-4-methyl-5-chloro-7-isopropylbenzoxazole hydrobromide having the formula:

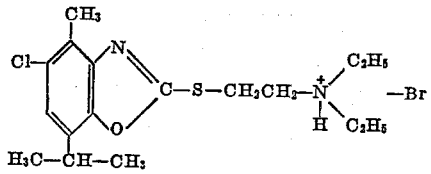

In the same manner as described in Example 1, but using 0.04 mole (9.2 grams) of 4-methyl-5-chloro-7-isopropyl-2-mercaptobenzoxazole (M. P. 197–200° C.) instead of the 5-tert-butyl-7-chloro-2-mercaptobenzoxazole therein specified, and precipitating with ethereal hydrogen bromide, a 98% yield of 2-(2-diethylaminoethylthio)-4-methyl-5-chloro-7-isopropylbenzoxazole hydrobromide, in the form of a white crystalline powder having a melting point of 269–270° C., after recrystallization from isopropanol, was obtained.

*Example 4.*—2-(2-diethylaminoethylthio)-4-methyl-5-chloro-7-isopropylbenzoxazole methobromide.

In the same manner as described in Example 2, but using the free base of the compound prepared in Example 3, the methobromide of 2-(2-diethylaminoethylthio)-4-methyl-5-chloro-7-isopropylbenzoxazole, which had a melting point of 212–213° C., after recrystallization from a mixture of isopropanol and isopropyl ether, was obtained in a yield of 82% of the stoichiometric.

*Example 5.*—2-(2-diethylaminoethylthio)-5-(1,1,3,3-tetramethylbutyl)benzoxazole having the formula:

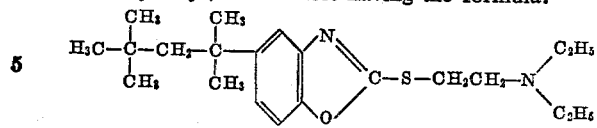

The 2-mercapto-5-(1,1,3,3-tetramethylbutyl)benzoxazole required for this preparation is an oil at room temperature and can be prepared from 2-amino-4-(1,1,3,3-tetramethylbutyl)phenol by reaction with potassium methyl xanthate in accordance with the general method described in our article in J. Org. Chem., May 1954, vol. 19, No. 5, page 765. 2-amino-4-(1,1,3,3-tetramethylbutyl)phenol, whose hydrochloride has a melting point of approximately 213–218° C., can be prepared from commercially available 4-(1,1,3,3-tetramethylbutyl)phenol by diazotization and subsequent reduction of the resulting 2-benzeneazophenol with sodium hydrosulfite in accordance with the general method described on page 764 of our foregoing article.

A mixture of 5.26 grams (0.02 mole) of 2-mercapto-4-(1,1,3,3-tetramethylbutyl)benzoxazole, 3.85 grams (0.028 mole) of potassium carbonate, 3.2 grams (0.024 mole) of 2-diethylaminoethyl chloride hydrochloride, and 27 milliliters of toluene and 20 milliliters of water was heated with stirring at reflux temperature for approximately 8 hours. After cooling, the aqueous layer was separated and extracted twice with ether. The ether extracts were then combined with the toluene layer. The base was precipitated as a gum by the addition of sodium bicarbonate to the reaction mixture until the pH was between 2 and 3 and allowed to stand overnight. The resulting gum was then collected by filtration.

*Example 6.*—2-(2-diethylaminoethylthio)-5-(1,1,3,3-tetramethylbutyl)benzoxazole methobromide.

The base prepared above (Example 5) was converted to the methobromide by reaction in solution in ethyl acetate with methyl bromide in the manner described in Example 2 hereinbefore.

*Example 7.*—2-(3-N-morpholino-n-propylthio)-5-tert-butyl-7-chlorobenzoxazole hydrochloride having the formula:

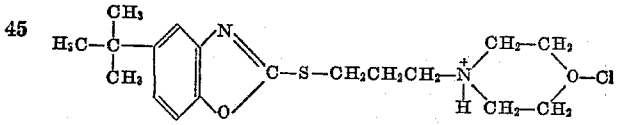

Into a flask provided with a mechanical stirrer and reflux condenser was added 5.0 grams (0.021 mole) of 5-tert-butyl-7-chloro-2-mercaptobenzoxazole, 1.2 grams (0.008 mole) of potassium carbonate, 3.6 grams (0.022 mole) of 3-N-morpholino-n-propyl chloride, 30 milliliters of water and 30 milliliters of toluene. The two-phase system was heated overnight under reflux, cooled, and the layers were separated. The aqueous phase was extracted with two 20-milliliter portions of ether and the ethereal extracts were combined with the toluene phase. The solvents were evaporated at reduced pressure, leaving a light tan-colored oil, which was the free base and weighed 7.0 grams, corresponding to 90% of the stoichiometric yield.

A portion of the oily base thus obtained was dissolved in ether and ethereal hydrogen chloride was added. The white powder which precipitated had a melting point of 212–213° C. On recrystallization from methyl ethyl ketone, short white crystals having substantially the same melting point were obtained. The elemental analysis of this product for carbon and hydrogen corresponded closely to that calculated for $C_{18}H_{26}Cl_2N_2O_2S$.

*Example 8.*—2 - (3 - n - Morpholino - n - propylthio) - 5 - tert - butyl - 7 - chlorobenzoxazole methiodide.

A solution of 2.20 grams (0.06 mole) of the crude oily 2 - (3 - N - morpholino - n - propylthio) - 5 - tert - butyl - 7-chlorobenzoxazole of the preceding example (7) and 1.0 milliliter of methyl iodide in 25 milliliters of ethyl acetate was heated under reflux for approximately 24 hours. The product which separated was collected by filtration and dried in the air. It weighed 2.9 grams, corresponding to 94% of the stoichiometric yield and melted to a semisolid at a temperature of 135° C. and then to a clear melt at 210° C. Repeated recrystallization did not change these melting characteristics of the product, whose elemental analysis for carbon and hydrogen conformed closely to that calculated for $C_{19}H_{28}ClIN_2O_2S$.

The following additional compounds were also prepared in manners similar to those disclosed hereinbefore. Their melting points (observed uncorrected temperatures) and the solvents from which each was recrystallized are those specified.

| Example: | | M. P., °C. |
|---|---|---|
| 9 | 2 - (2 - diethylaminoethylthio)benzoxazole hydrochloride (from ethyl acetate) | 159–160 |
| 10 | 2 - (2 - diethylaminoethylthio)benzoxazole methobromide (from benzene-methanol) | 154–155 |
| 11 | 2-(2 - diethylaminoethylthio)-5-chlorobenzoxazole hydrochloride (from methyl ethyl ketone) | 187–189 |
| 12 | 2-(2 - diethylaminoethylthio)-5-chlorobenzoxazole methobromide (from isopropanol) | 219–220 |
| 13 | 2-(2 - diethylaminoethylthio)-7-chlorobenzoxazole hydrochloride (from methanol-isopropanol) | 228–230 |
| 14 | 2-(2 - diethylaminoethylthio)-7-chlorobenzoxazole methobromide (from methanol-isopropanol) | 213–214 |
| 15 | 2-(2-diethylaminoethylthio) - 5 - nitrobenzoxazole hydrochloride (from isopropanol) | 223–224 |
| 16 | 2-(2-diethylaminoethylthio) - 5 - nitrobenzoxazole methobromide (from isopropanol-isopropyl ether) | 203–204 |
| 17 | 2-(2-diethylaminoethylthio) - 4 - tert-butylbenzoxazole hydrochloride (from isopropanol-isopropyl ether) | 184–185 |
| 18 | 2-(2-diethylaminoethylthio) - 4 - tert-butylbenzoxazole methobromide (from isopropanol-isopropyl ether) | [1] 132–145 |
| 19 | 2-(2-diethylaminoethylthio) - 5,7 - dichlorobenzoxazole hydrochloride (from isopropanol) | 233–235 |
| 20 | 2-(2-diethylaminoethylthio) - 5,7 - dichlorobenzoxazole methobromide (from ethylene chloride) | 200–201 |
| 21 | 2 - (2-diethylaminoethylthio)-5,7-dimethylbenzoxazole hydrochloride (from isopropanol) | 220–222 |
| 22 | 2 - (2-diethylaminoethylthio)-5,7-dimethylbenzoxazole methobromide (from isopropanol-isopropyl ether) | 180–182 |
| 23 | 2-(2-diethylaminoethylthio) - 5 - tert-butyl-7 - chlorobenzoxazole methiodide (from benzene-methylcyclohexane) | 169–171 |
| 24 | 2 - (2-diethylaminoethylthio)-4,5,7-trichlorobenzoxazole hydrochloride (from methanol) | 268–269 |
| 25 | 2 - (2-diethylaminoethylthio)-4,5,7-trichlorobenzoxazole methobromide (from isopropanol) | 232–233 |

[1] Indistinct.

Inasmuch as the foregoing specification comprises preferred embodiments of the invention, it is to be understood that the invention is not restricted thereto and that variations and modifications can be made therein in conventional manner without departing from the invention, whose scope is to be limited solely by the appended claims.

We claim:
1. A 2-(dialkylaminoalkylthio)benzoxazole of the group represented by the formula:

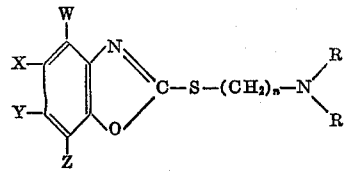

in which $n$ is a small integer; W is a radical of the group consisting of hydrogen and methyl; Y is hydrogen; and one of the radicals X and Z is an alkyl radical containing not more than 8 carbon atoms and the other is a radical of the group consisting of hydrogen and chlorine; and

is selected from the group consisting of di-(lower alkyl)-amino radicals and the morpholino radical, and the hydrohalide and quaternary salts thereof with lower alkyl halides.

2. 2 - (2 - diethylaminoethylthio) - 5 - tert - butyl - 7-chlorobenzoxazole hydrochloride.

3. 2 - (2 - diethylaminoethylthio) - 5 - tert - butyl - 7-chlorobenzoxazole methobromide.

4. 2 - (2 - diethylaminoethylthio) - 4 - methyl - 5-chloro - 7 - isopropylbenzoxazole hydrobromide.

5. 2 - (2 - diethylaminoethylthio) - 4 - methyl - 5-chloro - 7 - isopropylbenzoxazole methobromide.

6. 2 - (2 - diethylaminoethylthio) - 5 - (1,1,3,3 - tetramethylbutyl) - benzoxazole methobromide.

7. A process for the production of a 2-dialkylaminoalkylthio)-benzoxazole of the group defined in claim 1 which comprises heating together a dialkylaminoalkyl halide and a 2-mercaptobenzoxazole and subsequently recovering the resulting 2-(dialkylaminoalkylthio)benzoxazole.

No references cited.